(12) United States Patent
Iwasaki

(10) Patent No.: US 10,237,143 B2
(45) Date of Patent: Mar. 19, 2019

(54) MANAGEMENT APPARATUS AND CONTROL METHOD OF MANAGEMENT APPARATUS

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 474 days.

(21) Appl. No.: 14/356,436

(22) PCT Filed: Oct. 31, 2012

(86) PCT No.: PCT/JP2012/078766
§ 371 (c)(1),
(2) Date: May 6, 2014

(87) PCT Pub. No.: WO2013/069653
PCT Pub. Date: May 16, 2013

(65) Prior Publication Data
US 2014/0325067 A1  Oct. 30, 2014

Related U.S. Application Data

(60) Provisional application No. 61/556,471, filed on Nov. 7, 2011.

(30) Foreign Application Priority Data

Dec. 27, 2011  (JP) ................................. 2011-286554

(51) Int. Cl.
*H04L 12/24* (2006.01)
*G06F 21/62* (2013.01)
(Continued)

(52) U.S. Cl.
CPC .......... *H04L 41/24* (2013.01); *G06F 21/6218* (2013.01); *H04L 63/083* (2013.01);
(Continued)

(58) Field of Classification Search
CPC ........ H04L 1/00–1/0001; H04L 1/0015; H04L 1/0017; H04L 1/0019–1/0021;
(Continued)

(56) References Cited

U.S. PATENT DOCUMENTS 5,987,621 A * 11/1999 Duso .................... G06F 11/2023
348/E5.008
5,991,894 A * 11/1999 Lee ........................ H04L 1/1819
714/11

(Continued)

FOREIGN PATENT DOCUMENTS

EP         0903901       3/1999
JP      2000-242593      9/2000
(Continued)

OTHER PUBLICATIONS

Extended European Search Report (EESR) from European Patent Office (EPO) in European Pat. Appl. No. 12848470.6, dated Jul. 6, 2015.

(Continued)

*Primary Examiner* — Tauqir Hussain
*Assistant Examiner* — Boris D Grijalva Lobos
(74) *Attorney, Agent, or Firm* — Greenblum & Bernstein, P.L.C.

(57) ABSTRACT

A type of an access to a server, which is assigned to a user terminal as a server which provides a service to the user terminal in accordance with an access from the user terminal, is acquired, and it is judged whether or not the type is a prescribed type. When a frequency of judgment of "prescribed type" in the judgment is higher than a prescribed
(Continued)

frequency, an apparatus which executes the assignment is set so as not to assign the server to the user terminal from the next time.

8 Claims, 3 Drawing Sheets

(51) Int. Cl.
*H04L 29/06* (2006.01)
*H04L 29/08* (2006.01)
(52) U.S. Cl.
CPC .. *H04L 67/1002* (2013.01); *G06F 2221/2141* (2013.01); *H04L 41/28* (2013.01)
(58) Field of Classification Search
CPC ... H04L 1/20; H04L 1/24; H04L 12/00; H04L 12/24; H04L 12/2414; H04L 12/2415; H04L 12/2417–12/2419; H04L 12/2422; H04L 12/2424; H04L 12/2425; H04L 12/2428; H04L 12/2429; H04L 12/2431–12/2433; H04L 12/2435; H04L 12/2464–12/2465; H04L 12/2467–12/247; H04L 12/2472; H04L 12/26; H04L 12/2618; H04L 12/2634–12/2655; H04L 12/2692; H04L 29/00; H04L 41/00; H04L 41/04; H04L 41/06; H04L 41/0654–41/0668; H04L 41/08; H04L 41/0813; H04L 41/0823–41/0836; H04L 41/50; H04L 41/5003; H04L 41/5009–41/5019; H04L 43/00; H04L 43/04; H04L 43/08–43/0847
See application file for complete search history.

(56) References Cited

U.S. PATENT DOCUMENTS

| | | | | |
|---|---|---|---|---|
| 5,999,179 A * | 12/1999 | Kekic | ............ | H04L 41/0213 715/734 |
| 6,104,717 A * | 8/2000 | Coile | ............ | H01R 31/005 370/352 |
| 6,259,705 B1 | 7/2001 | Takahashi et al. | | |
| 6,317,775 B1 * | 11/2001 | Coile | ............ | H01R 31/005 709/201 |
| 6,442,552 B1 * | 8/2002 | Frolund | ............ | G06F 17/30861 707/613 |
| 7,373,524 B2 | 5/2008 | Motsinger et al. | | |
| 7,743,090 B1 * | 6/2010 | Gibson | ............ | G06F 11/2294 709/201 |
| 8,838,539 B1 * | 9/2014 | Ashcraft | ............ | G06F 17/30575 707/637 |
| 2002/0129294 A1 * | 9/2002 | Pedone | ............ | H04L 1/22 714/4.3 |
| 2004/0078622 A1 | 4/2004 | Kaminsky et al. | | |
| 2005/0188423 A1 | 8/2005 | Motsinger et al. | | |
| 2006/0155721 A1 * | 7/2006 | Grunwald | ............ | H04L 63/083 |
| 2007/0070987 A1 * | 3/2007 | Shibasaki | ............ | H04W 76/027 370/352 |
| 2008/0091830 A1 * | 4/2008 | Koshino | ............ | H04L 67/06 709/227 |
| 2008/0201602 A1 * | 8/2008 | Agarwal | ............ | G06F 11/2097 714/4.1 |
| 2009/0245113 A1 | 10/2009 | Kamiya | | |
| 2011/0016516 A1 * | 1/2011 | Mo | ............ | H04L 12/581 726/7 |
| 2011/0161335 A1 * | 6/2011 | Dash | ............ | G06F 17/30194 707/758 |
| 2011/0225142 A1 * | 9/2011 | McDonald | ............ | G06F 21/552 707/710 |
| 2011/0295925 A1 * | 12/2011 | Lieblich | ............ | G06F 9/5027 709/202 |
| 2012/0023378 A1 * | 1/2012 | Nomura | ............ | G06F 11/0709 714/48 |
| 2012/0030767 A1 * | 2/2012 | Rippert, Jr. | ............ | G06Q 10/10 726/25 |
| 2013/0191434 A1 * | 7/2013 | Smith | ............ | G06F 9/542 709/201 |
| 2014/0280398 A1 * | 9/2014 | Smith | ............ | G06F 9/544 707/825 |

FOREIGN PATENT DOCUMENTS

| | | |
|---|---|---|
| JP | 2003-131905 | 5/2003 |
| JP | 2004-192234 | 7/2004 |
| JP | 2004-240581 | 8/2004 |
| JP | 2006-331051 | 12/2006 |
| JP | 4081258 | 4/2008 |
| JP | 4667962 | 4/2011 |

OTHER PUBLICATIONS

International Search Report (ISR) in International Patent Application No. PCT/JP2012/078766, dated Feb. 5, 2013.

* cited by examiner

FIG. 4

| IDENTIFICATION INFORMATION | COUNT VALUE |
|---|---|
| SERVER A | 5 |
| SERVER B | 10 |
| SERVER C | 2 |
| SERVER D | 1 |
| ⋮ | ⋮ |

…

MANAGEMENT APPARATUS AND CONTROL METHOD OF MANAGEMENT APPARATUS

CLAIM FOR PRIORITY

This application is a U.S. National Stage of PCT/JP2012/078766 filed on Oct. 31, 2012, and claims the priority benefit of U.S. provisional application 61/556,471, filed Nov. 7, 2011, and Japanese application 2011-286554 filed on Dec. 27, 2011, the contents of which is expressly incorporated by reference herein in its entirety.

TECHNICAL FIELD

The present invention relates to a communication control technique.

BACKGROUND ART

Fault-tolerance is an important technique to assure system stability, and many methods are used in terms of software and hardware.

SUMMARY OF INVENTION

The present applicant focuses attention on a technique for reflecting a user action with respect to a system to fault-tolerance control, and provides a technique for controlling fault-tolerance based on the action.

According to the first aspect of the present invention, there is provided a management apparatus connected to a server, which is assigned to a user terminal as a server which provides a service to the user terminal in accordance with an access from the user terminal, comprising: judgment means for acquiring a type of an access from the user terminal to the server, and judging whether or not the type is a prescribed type; and control means for, when a frequency of judgment of the prescribed type by the judgment means is higher than a prescribed frequency, setting an apparatus which executes the assignment so as not to assign the server to the user terminal from the next time.

According to the second aspect of the present invention, there is provided a management apparatus connected to a server, which is assigned to a user terminal as a server which provides a service to the user terminal in accordance with an access from the user terminal, and to the user terminal, comprising: means for, when a frequency of reception of a message indicating that the user terminal has made an operation of a prescribed type from the user terminal is higher than a prescribed frequency, setting an apparatus which executes the assignment so as not to assign the server to the user terminal from the next time.

According to the third aspect of the present invention, there is provided a control method of a management apparatus connected to a server, which is assigned to a user terminal as a server which provides a service to the user terminal in accordance with an access from the user terminal, comprising: a judgment step of acquiring a type of an access from the user terminal to the server, and judging whether or not the type is a prescribed type; and a control step of setting, when a frequency of judgment of the prescribed type in the judgment step is higher than a prescribed frequency, an apparatus which executes the assignment so as not to assign the server to the user terminal from the next time.

According to the fourth aspect of the present invention, there is provided a control method of a management apparatus connected to a server, which is assigned to a user terminal as a server which provides a service to the user terminal in accordance with an access from the user terminal, and to the user terminal, comprising: a step of setting, when a frequency of reception of a message indicating that the user terminal has made an operation of a prescribed type from the user terminal is higher than a prescribed frequency, an apparatus which executes the assignment so as not to assign the server to the user terminal from the next time.

Further features of the present invention will become apparent from the following description of exemplary embodiments with reference to the attached drawings.

BRIEF DESCRIPTION OF DRAWINGS

FIG. 4 shows a configuration example of a table in which count values of respective servers managed by the management apparatus 100 are registered.

DESCRIPTION OF EMBODIMENTS

Embodiments of the present invention will be described hereinafter with reference to the accompanying drawings.

First Embodiment

Figure 1:
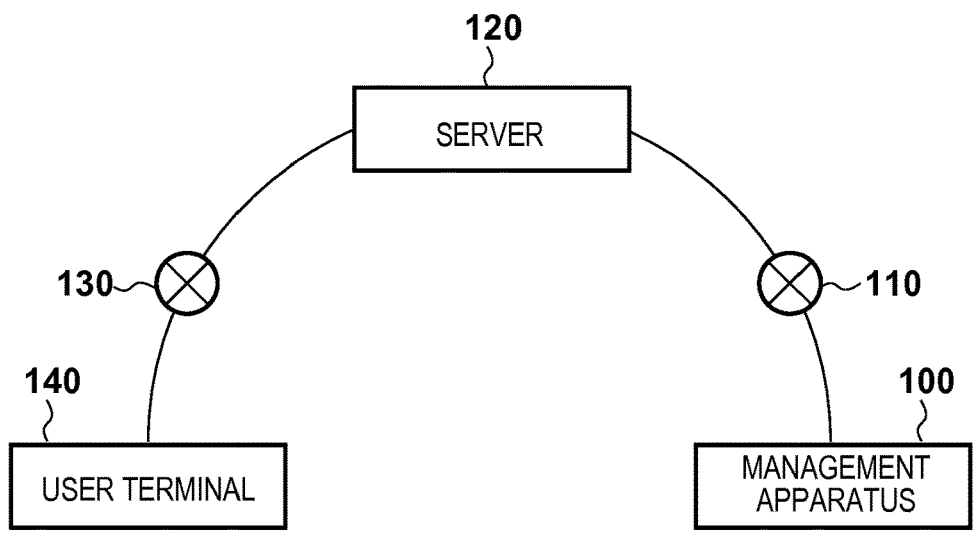
FIG. 1 is a block diagram showing an example of the arrangement of a system according to the first embodiment.

An example of the arrangement of a system according to this embodiment will be described first with reference to FIG. 1. FIG. 1 shows a user terminal 140, a management apparatus 100, and a server 120 which is assigned to the user terminal 140 of a plurality of servers. Respective apparatuses are connected via one or more types of networks such as a LAN and the Internet. More specifically, the user terminal 140 and server 120 are connected via a network 130 configured by one or more types of networks such as a LAN and the Internet. Also, the server 120 and management apparatus 100 are connected via a network 110 configured by one or more types of networks such as a LAN and the Internet.

The user terminal 140 is a computer such as a PC (Personal Computer) or mobile phone, and accesses the server 120, which is assigned to the user terminal 140 by the management apparatus 100 or another apparatus, of a plurality of servers included in the system according to this embodiment, so as to enjoy services provided by that server 120. This access includes a login request to the server 120, a service request access, a re-login request (a login request made within a given period since the previous login request), accesses made to change a service use setting and a login setting (to change an IP address or the like), a fault report access of the server 120, and the like.

The server 120 is a computer such as a PC, and is assigned to the user terminal 140 by the management apparatus 100 (or by another apparatus) from a plurality of servers included in the system according to this embodiment. This assignment is not limited to a specific method. Upon reception of an access from the user terminal 140, the server 120 executes processing according to this access. For example, upon reception of a login request (re-login request) from the user terminal 140, the server 120 executes processing for authenticating the user of the user terminal 140. When this authentication has succeeded, the server 120 transmits login information (to be described later) to the management apparatus 100 via the network 110, and begins to provide services to the user terminal 140 via the network 130. The service providing method is not the gist of this embodiment, and services may be provided by arbitrary methods. For example, contents (music pieces or movies) managed by the server 120 may be distributed to the user terminal 140 by, for example, streaming. When the server 120 provides a network game, it transmits a game screen and game information (information associated with other players and the like) to the user terminal 140 according to a request from the user terminal 140.

Upon reception of an access of a prescribed type such as a re-login request to the server 120, a login setting change access, or a fault report access of the server 120 from the user terminal 140, the server 120 notifies the management apparatus 100 of that access via the network 110.

The management apparatus 100 is a computer such as a PC, and assigns one of servers which are not registered in a list (to be described later) of a plurality of servers included in the system according to this embodiment (the server 120 is assigned in FIG. 1) to the user terminal 140 at an arbitrary timing before the beginning of services (for example, a reception timing of a service subscription notification from the user terminal 140).

Also, the management apparatus 100 manages information associated with a currently login user terminal to each server included in the system according to this embodiment, and also manages a frequency of accesses of prescribed types to that server.

Note that this "access frequency" is not limited to one definition, and may be defined simply as "the number of times of accesses so far" or as "the number of times of accesses within a previous given period".

Then, the management apparatus 100 registers identification information of a server whose managed frequency is higher than a prescribed frequency in the list (to be described later), so as to exclude that server from those to be assigned to user terminals from the next time. In other words, upon assigning a server to the user terminal 140 for the next time, the management apparatus 100 assigns one of servers other than those whose managed frequency is higher than the prescribed frequency of a plurality of servers included in the system according to this embodiment.

Note that the system arrangement shown in FIG. 1 is an example of that simplified for the purpose of easy understanding of this embodiment, and the system arrangement to which operation rules of respective apparatuses described in this embodiment are applicable may be those other than the system arrangement shown in FIG. 1.

Figure 2:
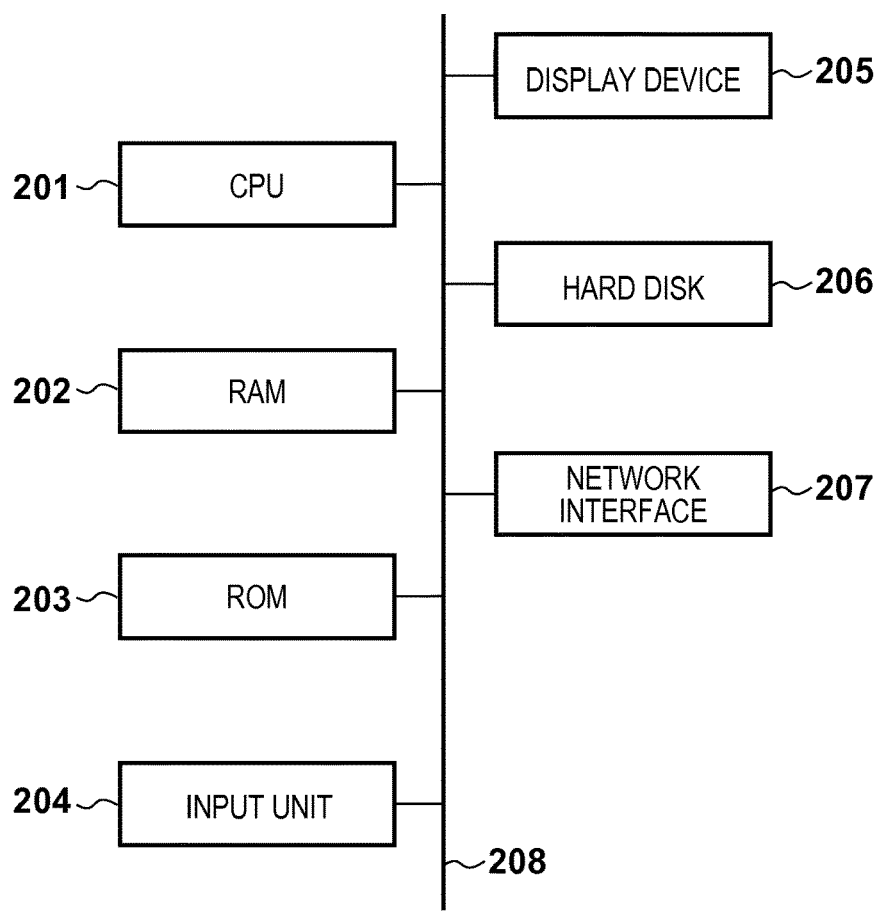
FIG. 2 is a block diagram showing an example of the hardware arrangement of a management apparatus 100.

An example of the hardware arrangement of the management apparatus 100 will be described below with reference to FIG. 2 showing the example of the hardware arrangement of the management apparatus 100. Note that not all components shown in FIG. 2 are always indispensable, and some components may not be required or may be added according to the circumstances.

A CPU 201 executes operation control of the overall management apparatus 100 using computer programs and data stored in a RAM 202 and ROM 203, and executes respective processes which will be described later as those to be implemented by the management apparatus 100.

The RAM 202 has an area used to temporarily store computer programs and data loaded from a hard disk 206, various data received from the server 120 via a network interface 207, and the like. Furthermore, the RAM 202 has a work area used when the CPU 201 executes various processes. That is, the RAM 202 can provide various areas as needed.

The ROM 203 stores configuration data, a boot program, and the like, for the management apparatus 100.

An input unit 204 includes devices such as a keyboard and mouse, which can be operated by the user to input instructions, and the user can give various instructions to the CPU 201 by operating the input unit 204.

A display device 205 can display a result of processing executed by the CPU 201 by images and characters.

The hard disk 206 saves an OS (Operating System) of the management apparatus 100, and computer programs and data used to control the CPU 201 to execute respective processes which will be described later as those to be implemented by the management apparatus 100. Also, the hard disk 206 saves various kinds of information to be described as those to be managed by the management apparatus 100 and those to be described as given information. The computer programs and data saved in the hard disk 206 are loaded as needed onto the RAM 202 under the control of the CPU 201, and are to be processed by the CPU 201.

The network interface 207 is used to connect the management apparatus 100 to the network 110. The management apparatus 100 can make data communications with the server 120 connected to the network 110 via this network interface 207.

The aforementioned units are connected to a bus 208.

Assume that in this embodiment, both the user terminal 140 and server 120 have the same hardware arrangement as that of the management apparatus 100, that is, the hardware arrangement shown in FIG. 2, for the sake of simplicity. Therefore, in the following description, processes which will be described as those to be implemented by the user terminal 140 are executed by the CPU 201 of the user terminal 140, and processes which will be described as those to be implemented by the server 120 are executed by the CPU 201 of the server 120. Note that various hardware arrangements are applicable to the user terminal 140 and server 120, and the present invention is not limited to the hardware arrangement shown in FIG. 2.

Figure 3:
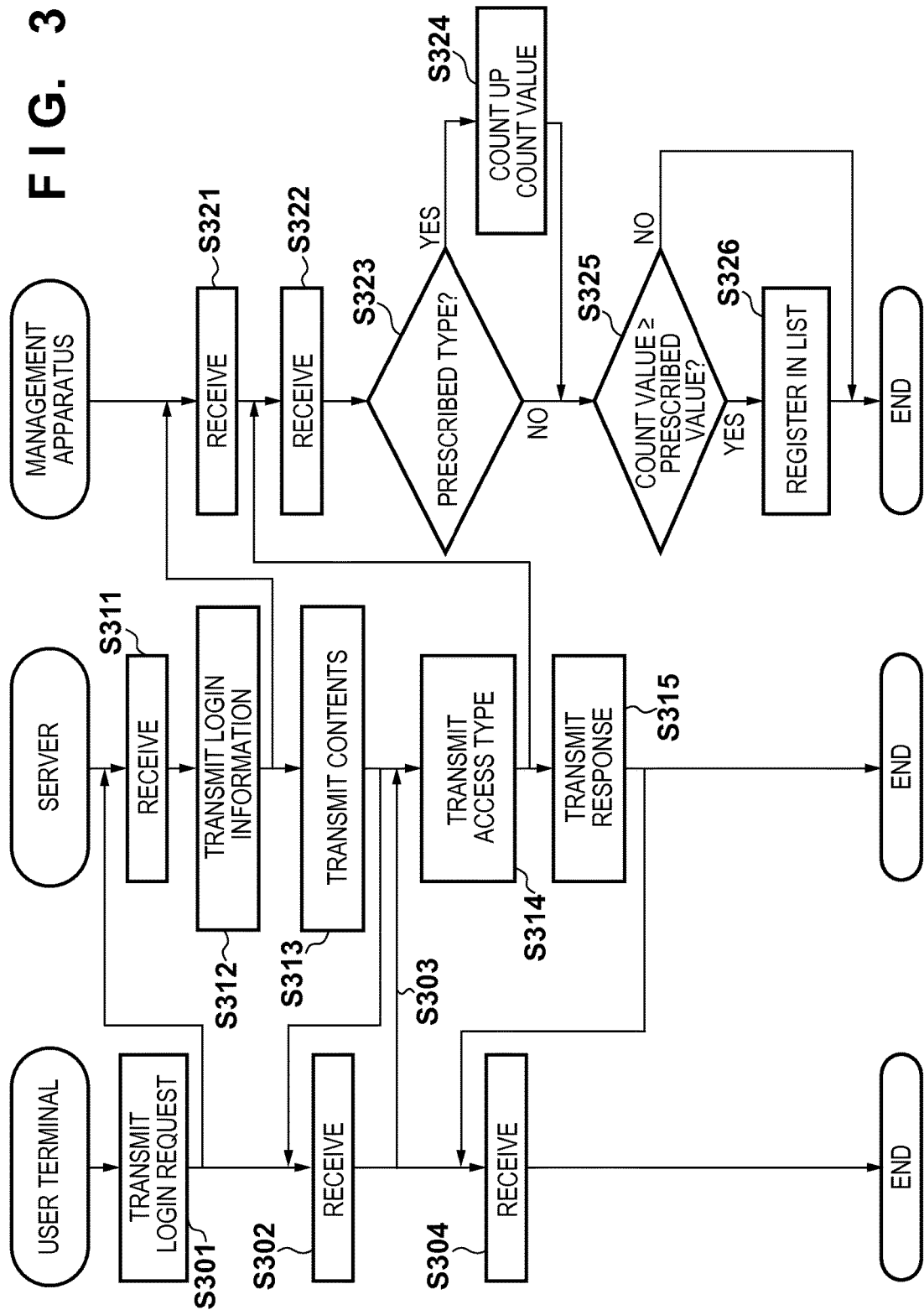
FIG. 3 is a flowchart of processes respectively executed by a user terminal 140, a server 120, and the management apparatus 100.

Processes to be respectively executed by the user terminal 140, server 120, and management apparatus 100 will be described below with reference to the flowchart shown in FIG. 3.

In step S301, the user terminal 140 transmits a login request to the server 120. This login request includes information required for authentication to be described later such as a user ID and login password of the user terminal 140. Such login request is input to the server 120 via the network 130.

Upon reception of this login request, the server 120 executes authentication processing using this login request in step S311. Since this authentication processing is a known technique, a detailed description thereof will not be given. For example, the server 120 compares a password which is held in advance in association with the user ID included in this login request, and that included in this login request. If these passwords match, the server 120 judges that the authentication has succeeded; otherwise, it judges that the authentication has failed. FIG. 3 shows a case in which this authentication has succeeded. However, if this authentication has failed, the server 120 notifies the user terminal 140 of an authentication failure message.

In step S312, the server 120 generates login information which includes the user ID and password included in the login request, information indicating that the user terminal 140 has logged in the server 120, and the like, and transmits the generated login information. This transmitted login information is input to the management apparatus 100 via the network 110.

In step S321, the CPU 201 of the management apparatus 100 receives the login information transmitted from the server 120 via the network interface 207, and stores the received login information in, for example, the hard disk 206.

If the authentication has succeeded, the server 120 begins to provide services to the user terminal 140 via the network 130. Therefore, in step S313, the server 120 transmits, to the user terminal 140, contents (music pieces or movies) managed by itself or a game screen and game information according to a request from the user terminal 140. Note that the server 120 may control one or more external devices to execute processing so as to provide services, and may transmit the execution result to the user terminal 140.

In step S302, the user terminal 140 plays back the information transmitted from the server 120. For example, when the aforementioned contents are transmitted from the server 120 and when the contents include image data, the user terminal 140 displays an image based on this image data. When the contents include audio data, the user terminal 140 outputs sound based on this audio data. Or when the aforementioned game screen and game information are transmitted from the server 120, the user terminal 140 displays this game screen, and makes audio and visual output operations according to the game information.

After that, if an access 303 (S303) from the user terminal 140 to the server 120 occurs, the server 120 judges a type of this access 303 (step S314). Note that this access 303 may be that of the prescribed type described above, or that of a type other than the prescribed type such as a content request access or an operation instruction access associated with the game.

Note that the judgment of the access type in step S314 is a known technique. Then, the server 120 transmits the judged type to the management apparatus 100 in step S314.

Note that the type of the access 303 may be judged by an apparatus other than the server 120. For example, when the management apparatus 100 monitors an access to the server 120, the management apparatus 100 may discriminate this access type.

In step S315, the server 120 transmits a response to the access 303 to the user terminal 140. In step S304, the user terminal 140 receives this response.

In step S322, the CPU 201 receives the type of the access 303 transmitted from the server 120 via the network interface 207. The CPU 201 judges in step S323 whether or not the type of the access 303 is the prescribed type. If it is determined that the type of the access 303 is the prescribed type, the process advances to step S324; otherwise, the process advances to step S325.

For example, if the type of the access 303 is one of a re-login access to the server 120, a login setting change access to the server 120, and a fault report access of the server 120, the process advances to step S324 via step S323. If the type of the access 303 is none of these accesses, the process advances to step S325 via step S323.

In step S324, the CPU 201 counts up a count value managed in association with the server 120 by 1 (an increment of the count-up operation is not limited to 1). That is, the number of times (frequency) of judgment indicating that the type of the access 303 to the server 120 is the prescribed type is counted by this count value.

Note that in practice, since a plurality of servers are connected to the management apparatus 100, the management apparatus 100 holds, for each server connected to the management apparatus 100, identification information (network address, serial number, etc.) of that server and a count value managed in association with that server in the hard disk 206, as shown in FIG. 4.

The CPU 201 counts up a count value managed in association with a server which received the access 303 of the prescribed type by 1. For example, assume that the CPU 201 receives the types of accesses 303 from server A, server B, and server C, and the types received from the servers A and C correspond to the prescribed type. In this case, the CPU 201 counts up a count value managed in association with the server A by 1, and also counts up a count value managed in association with the server C by 1.

The CPU 201 judges in step S325 whether or not the count value managed in association with the server 120 is relatively larger than those managed in association with other servers. In this judgment, with reference to count values for respective servers in the table shown in FIG. 4, a relatively large count value of these count values, and a server corresponding to that count value (strictly speaking, identification information of the server) can be specified.

Assume that three servers, that is, the server A, the server B, and the server C are connected to the management apparatus 100. In this case, the CPU 201 refers to count values A to C of the servers A to C. Then, for example, the CPU 201 specifies a count value larger than an average value of count values A to C from count values A to C. Note that the average value is used as a prescribed value. However, other statistical amounts may be used as the prescribed value as long as they can be calculated form count values A to C.

In practice, the management apparatus 100 refers to count values managed in association with not only the server 120 but also all servers, and specifies count values equal to or larger than the prescribed value.

Then, when a count value managed in association with the server 120 is equal to or larger than the prescribed value calculated from count values managed in association with other servers (which may include the server 120), the process advances to step S326; otherwise, a normal operation (for example, to wait for an access from the server 120) is executed.

In step S326, the CPU 201 creates a list to exclude the server 120 from servers to be assigned. For example, the CPU 201 creates a list used to register identification information of a server which cannot be assigned to any of user terminals (including the user terminal 140) in the hard disk 206, and registers identification information of the server 120 in this list. Thus, from the next time, when a server is assigned to the user terminal 140, a server which is not registered in the list need only be assigned, and the server 120 can be consequently separated from the system.

Such process in step S326 is "to set an apparatus which executes assignment so as not to assign the server 120 to a user terminal from the next time".

Note that the CPU 201 may immediately execute processing for assigning one (new server) of servers which are not registered in this list of a plurality of servers included in the system according to this embodiment to the user terminal 140 at the timing of step S326.

With the aforementioned processing, when the number of times (frequency) of judgment indicating that the type of the access 303 to the server 120 is the prescribed type is equal to or larger than the prescribed value, this server 120 can be excluded from those to be assigned from the next time. For example, when accesses such as a re-login access to the server 120, a login setting change access to the server 120, and a fault report access of the server 120 are made to the server 120 by the prescribed number of times or more, it is considered that this server 120 suffers any problem. Hence, this embodiment considers a server to which accesses of the prescribed types are made by the prescribed number of times or more as a problematic server, and excludes from hosts used to provide services to user terminals.

Second Embodiment

In the first embodiment, when the user terminal 140 makes an access to the server 120, the server 120 judges a type of that access, and notifies the management apparatus 100 of the judged type. The management apparatus 100 judges whether or not the notified type is the prescribed type. However, since the user terminal 140 side has already recognized whether or not to make an access of the prescribed type, the user terminal 140 may directly notify the management apparatus 100 that it has made an access of the predetermined type. In this case, upon reception of the notification indicating that the user terminal 140 has made the access of the prescribed type to the server 120, the management apparatus 100 counts up a count value corresponding to that server 120. The subsequent processes are the same as those of the first embodiment.

Third Embodiment

The arrangement described in the first embodiment is merely an example. Any other arrangements may be adopted as long as a type of an access made to a server, which is assigned to a user terminal as a server which provides services to the user terminal in response to an access from the user terminal, is acquired, it is judged whether or not the type is the prescribed type, and an apparatus which executes assignment is set not to assign the server to a user terminal from the next time when a frequency of judgment indicating "the prescribed type" is higher than a prescribed frequency.

Fourth Embodiment

In the first embodiment, when the type of the access is the prescribed type, the management apparatus 100 counts up a count value. However, if an operation locally made on the user terminal side (user action) corresponds to a prescribed action (restart of the user terminal or the like), the management apparatus 100 may be notified of that operation. The management apparatus 100 may specify a server connected to that user terminal at that time, and may count up a count value of the specified server.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of U.S. Patent Provisional Application No. 61/556,471, filed Nov. 7, 2011, and Japanese Patent Application No. 2011-286554, filed Dec. 27, 2011, which are hereby incorporated by reference herein in their entirety.

The invention claimed is:

1. A management apparatus connected to a server, the server being assigned to a user terminal for providing a service to the user terminal in accordance with an access request from the user terminal, the management apparatus comprising:
   a processor; and
   a memory including a set of instructions that, when executed by the processor, causes the processor to perform operations including:
      acquiring a notification sent from the user terminal, wherein the user terminal determines whether or not a user action locally made by a user on the user terminal corresponds to a predetermined user action and sends the notification to the management apparatus when the user action locally made by the user on the user terminal corresponds to the predetermined user action;
      when the notification is acquired from the user terminal, increasing a number of times of an acquisition of the notification managed in association with the server, and judging whether or not the number of times is larger than numbers of times of the acquisition of the notification managed in association with other servers connected to the management apparatus,
      when the number of times of the acquisition of the notification managed in association with the server is larger than the numbers of times of the acquisition of the notification managed in association with the other servers, registering identification information of the server to a list; and
      when the identification information of the server is registered to the list, assigning to the user terminal at a next access request from the user terminal, among the other servers connected to the management apparatus, a second server whose identification information is not registered in the list.

2. A non-transitory computer-readable storage medium storing a computer program including the set of instructions for controlling the processor to function as the management apparatus of claim 1.

3. The management apparatus according to claim 1, wherein the processor only registers the identification information of the server to the list when the number of times of the acquisition of the notification sent from the user terminal is larger than the numbers of times of the acquisition of the notification managed in association with the other servers.

4. The management apparatus according to claim 1, further comprising:
   a hard disk that stores the identification information of the server in association with the number of times managed for the server.

5. The management apparatus according to claim 1, wherein the predetermined user action includes a restart operation of the user terminal by the user.

6. A management apparatus connected to servers, the servers being assigned to user terminals for providing a service to the user terminals in accordance with access requests from the user terminals, the management apparatus comprising:
   a processor; and a memory including a set of instructions that, when executed by the processor, causes the processor to perform operations including:

determining a frequency of reception of a first message from the user terminals, the first message indicating that one of the user terminals has made an operation of a prescribed type to a first server;

determining a frequency of reception of a second message from the user terminals, the second message indicating that one of the user terminals has made the operation of the prescribed type to a second server;

acquiring a prescribed value, the prescribed value being calculated based on the frequency of reception of the first message and the frequency of reception of the second message; and when the frequency of reception of the first message is larger than the prescribed value, setting an apparatus which executes an assignment of servers to user terminals to not assign the first server to the user terminals at a next access request from the user terminals and to assign one of the servers whose managed frequency is lower than the prescribed value to the user terminals at the next access request from the user terminals.

7. A control method of a management apparatus connected to a server, the server being assigned to a user terminal for providing a service to the user terminal in accordance with an access request from the user terminal, the control method comprising:

acquiring a notification sent from the user terminal, wherein the user terminal determines whether or not a user action locally made by a user on the user terminal corresponds to a predetermined user action and sends the notification to the management apparatus when the user action locally made by the user on the user terminal corresponds to the predetermined user action;

when the notification is acquired from the user terminal, increasing a number of times of an acquisition of the notification managed in association with the server, and judging whether or not the number of times is larger than numbers of times of the acquisition of the notification managed in association with other servers connected to the management apparatus, when the number of times of the acquisition of the notification managed in association with the server is larger than the numbers of times of the acquisition of the notification managed in association with the other servers, registering identification information of the server to a list; and when the identification information of the server is registered to the list, assigning to the user terminal at a next access request from the user terminal, among the other servers connected to the management apparatus, a second server whose identification information is not registered in the list.

8. A control method of a management apparatus connected to servers, the servers being assigned to user terminals for providing a service to the user terminals in accordance with access requests from the user terminals, the control method comprising:

determining a frequency of reception of a first message from the user terminals, the first message indicating that one of the user terminals has made an operation of a prescribed type to a first server;

determining a frequency of reception of a second message from the user terminals, the second message indicating that one of the user terminals has made the operation of the prescribed type to a second server;

acquiring a prescribed value, the prescribed value being calculated based on the frequency of reception of the first message and the frequency of reception of the second message; and setting, when the frequency of reception of the first message is larger than the prescribed frequency, an apparatus which executes an assignment of servers to user terminals to not assign the first server to the user terminals at a next access request from the user terminals and to assign one of the servers whose managed frequency is lower than the prescribed value to the user terminals at the next access request from the user terminals.

* * * * *